(12) United States Patent
Van Schyndel et al.

(10) Patent No.: US 7,843,630 B2
(45) Date of Patent: Nov. 30, 2010

(54) CASCADED OPTICAL AMPLIFIER AND CONTROL METHOD THEREOF

(75) Inventors: André Van Schyndel, Kanata (CA); Kevan Jones, Kanata (CA); Selina G. Farwell, Paignton (GB)

(73) Assignee: Oclaro Technology Limited, Northamptonshire (GB)

( * ) Notice: Subject to any disclaimer, the term of this patent is extended or adjusted under 35 U.S.C. 154(b) by 285 days.

(21) Appl. No.: 11/970,181

(22) Filed: Jan. 7, 2008

(65) Prior Publication Data

US 2008/0212167 A1    Sep. 4, 2008

Related U.S. Application Data

(60) Provisional application No. 60/883,869, filed on Jan. 8, 2007.

(51) Int. Cl.
*H01S 3/00* (2006.01)

(52) U.S. Cl. .................................. 359/337.4; 359/337.5

(58) Field of Classification Search .............. 359/337.4, 359/337.5
See application file for complete search history.

(56) References Cited

U.S. PATENT DOCUMENTS

| | | | |
|---|---|---|---|
| 6,359,727 B1 * | 3/2002 | Nakazato ................. 359/337.4 |
| 6,366,393 B1 | 4/2002 | Feulner et al. | |
| 6,462,862 B2 * | 10/2002 | Kinoshita ................... 359/334 |
| 6,690,505 B1 | 2/2004 | Ye | |
| 7,133,196 B1 * | 11/2006 | Lee et al. ................. 359/337.4 |
| 7,215,464 B1 * | 5/2007 | Komaki et al. ......... 359/341.44 |
| 7,391,560 B2 * | 6/2008 | Natori et al. ............. 359/337.4 |
| 2003/0086139 A1 | 5/2003 | Wing So | |
| 2004/0021932 A1 | 2/2004 | Maurer et al. | |
| 2004/0051938 A1 | 3/2004 | Chan et al. | |
| 2006/0087723 A1 | 4/2006 | Takeyama et al. | |

OTHER PUBLICATIONS

International Search Report and Written Opinion for corresponding International Application No. PCT/IB2008/000022 mailed Jun. 16, 2008.

* cited by examiner

*Primary Examiner*—Mark Hellner
(74) *Attorney, Agent, or Firm*—Renner, Otto, Boisselle & Sklar, LLP

(57) ABSTRACT

A cascaded optical amplifier including a first optical amplifier and a second optical amplifier in cascaded arrangement is provided. Each of the first optical amplifier and the second optical amplifier has a respective input for receiving an optical signal, an output for outputting an amplified optical signal, and a control input for controlling the gain of the optical amplifier. The cascaded optical amplifier includes a sensor for sensing upstream of the input of the second optical amplier a signal relating to operation of the cascaded optical amplifier. In addition, the cascaded optical amplifier includes a controller for providing control signals to the respective control inputs of the first amplifier and the second amplifier, the controller providing the control signal to the second optical amplifier as a function of the sensed signal.

24 Claims, 10 Drawing Sheets

CASCADED OPTICAL AMPLIFIER AND CONTROL METHOD THEREOF

CROSS REFERENCE TO RELATED APPLICATION

This application claims priority under 35 U.S.C. §119 to U.S. Provisional Application No. 60/883,869, filed Jan. 8, 2007, the entire disclosure of which is incorporated herein by reference.

TECHNICAL FIELD

The present invention relates generally to optical amplifiers, and more particularly to two or more optical amplifiers in cascaded arrangement.

BACKGROUND OF THE INVENTION

Erbium doped fiber amplifiers (EDFAs) are used extensively alone or in subsystems to amplify fiber optic signals in single channel and dense wavelength division multiplexing (DWDM) optical networks. The EDFA has the capability of passing energy from a "pump" laser to the optical signal to be amplified. The gain of the EDFA is a function of the input, the pump power and their corresponding history (e.g., over the previous milliseconds).

Subsystems and module products available in recent years contain two or more EDFAs cascaded together and separated by a dispersion compensation module (DCM) which can by the nature of its design also introduce a delay. For example, FIG. 1 shows a conventional two-stage cascaded optical amplifier 14. An add/drop type optical signal is input to a first EDFAa and its amplified output is input to a second EDFAb. The output of EDFAa is coupled to the input of EDFAb via a DCM with its corresponding delay. The output of EDFAb represents the output of the cascaded amplifier.

A first control algorithm 20 provides gain control of EDFAa. A power coupler or tap 22 senses the power of the optical signal input to EDFAa and provides a control input PINa1 to the control algorithm 20. Similarly, a tap 24 senses the power of the amplified optical signal output by EDFAa and provides a control input PINa2 to the control algorithm. The control algorithm 20 compares the output power of EDFAa to the input power of EDFAa. Based on the desired gain of EDFAa, the control algorithm 20 provides a gain control signal to EDFAa in the form of a pump control signal to Pump a. By controlling the laser pump energy delivered by Pump a, the control algorithm 20 controls the gain provided by EDFAa.

The amplified optical signal output from EDFAa is coupled to the input of EDFAb via a DCM 26. EDFAb in turn further amplifies the optical signal output from EDFAa. A second control algorithm 30 serves to provide gain control of EDFAb. Specifically, a tap 32 outputs a control input PINb1 indicative of the power of the input signal to EDFAb, and a tap 34 provides a control input PINb2 indicative of the power of the optical signal output by EDFAb. The control algorithm 30 receives the control inputs PINb1 and PINb2 and based thereon compares the input and output signal power of EDFAb with the desired gain. Based on such comparison, the control algorithm 30 controls the laser pump energy delivered by Pump b, which in turn controls the gain of EDFAb.

Cascaded optical amplifiers such as that shown in FIG. 1 have generally provided satisfactory results. However, there have been certain drawbacks or disadvantages that have led to less than optimum performance. For example, errors or noise introduced by amplifiers upstream tend to accumulate and are exaggerated by amplifiers downstream in the cascade.

In view of the aforementioned shortcomings associated with existing cascaded optical amplifiers, there is a strong need in the art for a cascaded amplifier that is less prone to the accumulation of errors and/or noise. Moreover, there is a strong need in the art for a cascaded amplifier in which downstream amplifiers exhibit an improved dynamic response.

SUMMARY OF THE INVENTION

According to one aspect of the invention, a cascaded optical amplifier including a first optical amplifier and a second optical amplifier in cascaded arrangement is provided. Each of the first optical amplifier and the second optical amplifier has a respective input for receiving an optical signal, an output for outputting an amplified optical signal, and a control input for controlling the gain of the optical amplifier. The cascaded optical amplifier includes a sensor for sensing upstream of the input of the second optical amplifier a signal relating to operation of the cascaded optical amplifier. In addition, the cascaded optical amplifier includes a controller for providing control signals to the respective control inputs of the first optical amplifier and the second optical amplifier, the controller providing the control signal to the second optical amplifier as a function of the sensed signal.

In accordance with another aspect, the sensed signal represents the optical signal input to the first optical amplifier.

According to still another aspect, the sensed signal represents the amplified optical signal output from the first optical amplifier.

According to another aspect, the sensor comprises first and second sensors, and the sensed signal includes a first sensed signal representing the optical signal input to the first optical amplifier and a second sensed signal representing the amplified optical signal output from the first optical amplifier.

In accordance with another aspect, the cascaded optical amplifier further includes at least a third optical amplifier included in the cascaded arrangement between the first and second optical amplifiers.

With still another aspect, the controller provides the control signal to the second optical amplifier based on a comparison of the amplified optical signal output or the pump drive signal from the second optical amplifier and the sensed signal.

According to yet another aspect, the comparison comprises a ratio.

According to still another aspect, the controller includes a sensed signal delay element for providing a delay to the sensed signal, the amount of the delay being determined to synchronize approximately the sensed signal received by the controller with at least one other signal received by the controller for carrying out control.

According to still another aspect, there is little or no delay between the two amplifiers.

According to yet another aspect, the cascaded optical amplifier further includes a delay introducing element coupled between the output of the first optical amplifier and the input of the second optical amplifier, and the sensed signal is sensed upstream of the delay introducing element.

With still another aspect, the first optical amplifier and the second optical amplifier are erbium doped fiber amplifiers.

In accordance with another aspect, the controller delays the sensed signal as a function of the delay introduced by the delay introducing element as measured by the controller.

According to still another aspect, the delay introducing element is a dispersion compensation module (DCM).

According to another aspect of the invention, a method of controlling a cascaded optical amplifier is provided. The cascaded optical amplifier includes a first optical amplifier and a second optical amplifier in cascaded arrangement. Each of the first optical amplifier and the second optical amplifier has a respective input for receiving an optical signal, an output for outputting an amplified optical signal, and a control input for controlling the gain of the optical amplifier. The cascaded optical amplifier further includes a controller for providing control signals to the respective control inputs of the first amplifier and the second amplifier. The method includes the steps of sensing upstream of the input of the second optical amplifier a signal relating to operation of the cascaded optical amplifier, and providing the control signal to the second optical amplifier as a function of the sensed signal.

According to another aspect, the sensed signal represents the optical signal input to the first optical amplifier.

According to still another aspect, the sensed signal represents the amplified optical signal output from the first optical amplifier.

In accordance with yet another aspect, the sensing step includes sensing a first sensed signal representing the optical signal input to the first optical amplifier and sensing a second sensed signal representing the amplified optical signal output from the first optical amplifier.

With yet another aspect, the method includes the step of providing the control signal to the second optical amplifier based on a comparison of the amplified optical signal output or the pump drive signal from the second optical amplifier and the sensed signal.

In accordance with another aspect, the comparison includes a ratio.

According to still another aspect, the method includes the step of providing a delay to the sensed signal, the amount of the delay being determined to synchronize approximately the sensed signal received by the controller with at least one other signal received by the controller for carrying out control.

In yet another aspect, the first optical amplifier and the second optical amplifier are erbium doped fiber amplifiers.

According to another aspect, the cascaded amplifier further comprises a delay introducing element coupled between the output of the first optical amplifier and the input of the second optical amplifier, and the sensed signal is sensed upstream of the delay introducing element.

According to another aspect, the method includes the step of delaying the sensed signal as a function of the delay introduced by the delay introducing element as measured in a measuring step.

In accordance with yet another aspect, the delay introducing element is a dispersion compensation module (DCM).

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION OF THE INVENTION

The present invention will now be described with reference to the figures, in which like elements are used to refer to like elements throughout.

Figure 1:
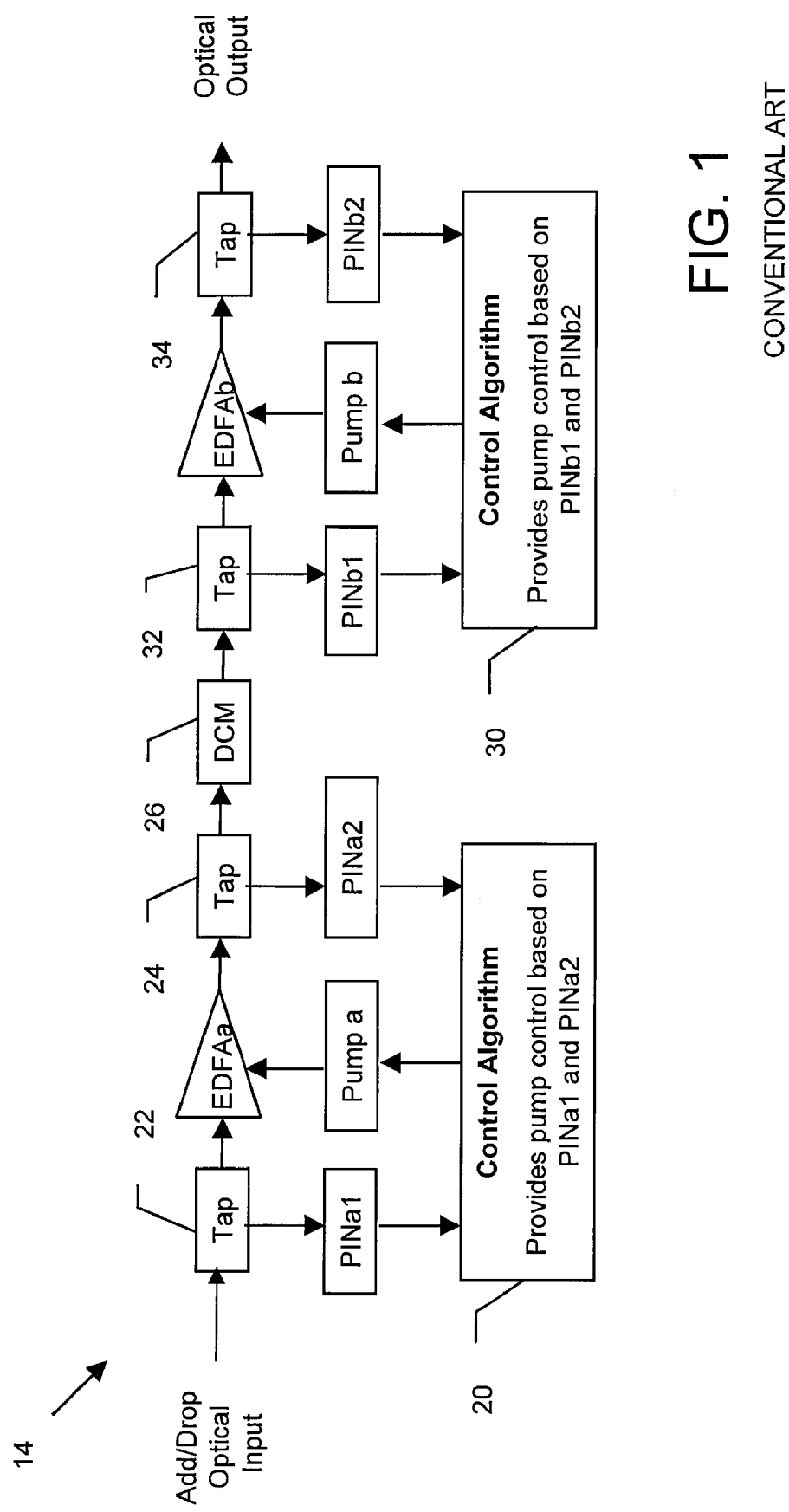
FIG. 1 is a block diagram of a conventional cascaded optical amplifier.
Figure 2:
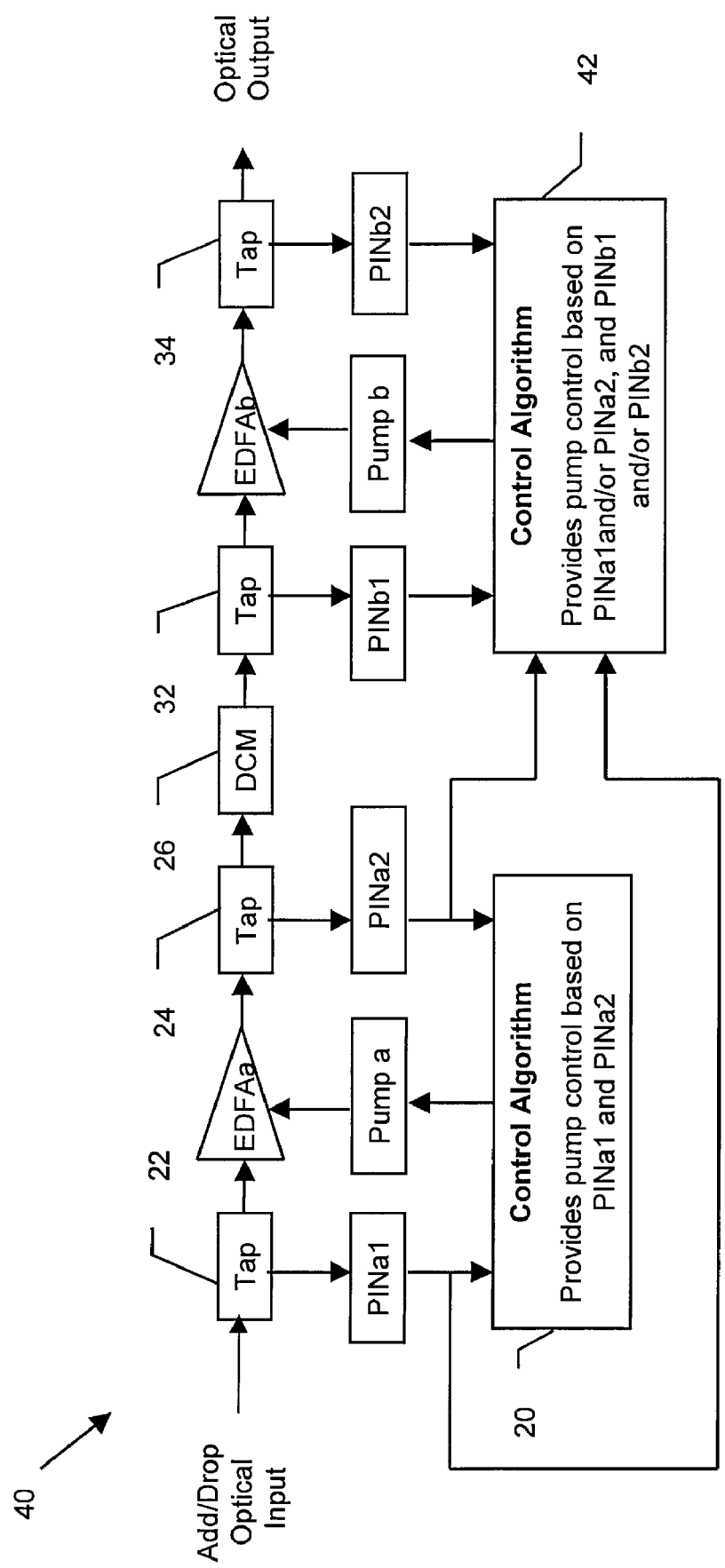
FIG. 2 is a block diagram of a cascaded optical amplifier in accordance with an exemplary embodiment of the present invention.

Referring to FIG. 2, a cascaded optical amplifier 40 is shown in accordance with an exemplary embodiment of the invention. The amplifier 40 is a two-stage optical amplifier similar to the conventional amplifier 14 shown in FIG. 1. However, those having ordinary skill in the art will appreciate that the optical amplifier 40 could have more than two stages cascaded together without departing from the scope of the invention.

The optical amplifier 40 is similar to the conventional amplifier in FIG. 1 in that the amplifier 40 includes EDFAa and EDFAb cascaded in series. Again, an add/drop type optical signal is input to a first EDFAa and its amplified output is input to a second EDFAb. The output of EDFAa is coupled to the input of EDFAb via a DCM or other delay causing element that introduces a time delay to the signal prior to being input to the second EDFAb. The output of EDFAb represents the output of the cascaded amplifier.

Similarly, a first control algorithm 20 provides gain control of EDFAa. A power coupler or tap 22 senses the power of the optical signal input to EDFAa and provides a control input PINa1 to the control algorithm 20. As in the conventional amplifier 14, a tap 24 senses the power of the amplified optical signal output by EDFAa and provides a control input PINa2 to the control algorithm 20. The control algorithm 20 compares the output power of EDFAa to the input power of EDFAa. Based on the desired gain of EDFAa, the control algorithm 20 provides a gain control signal to EDFAa in the form of a pump control signal to Pump a. By controlling the laser pump energy delivered by Pump a, the control algorithm 20 controls the gain provided by EDFAa.

The amplified optical signal output from EDFAa is coupled to the input of EDFAb via a DCM 26. EDFAb in turn further amplifies the optical signal output from EDFAa. A second control algorithm 42, different from the second control algorithm 30 described above in connection with the conventional amplifier 14 as explained in more detail below, serves to provide gain control of EDFAb. Specifically, a tap 32 outputs a control input PINb1 indicative of the power of the input signal to EDFAb, and a tap 34 provides a control input PINb2 indicative of the power of the optical signal output by EDFAb. The control algorithm 42 receives the control inputs PINb1 and PINb2 in accordance with one embodiment of the invention, and compares the input and output signal power of EDFAb with the desired gain based thereon. The control algorithm 42 in turn controls the laser pump energy delivered by Pump b based on such comparison, which in turn controls the gain of EDFAb.

The optical amplifier 40 of the present invention differs from the conventional amplifier 14 of FIG. 1 primarily in the manner in which the control algorithm 42 controls the gain of the second (or subsequent) amplifier EDFAb among the cascaded amplifiers. Specifically, one or more control inputs for controlling the gain of EDFAb are based on signals obtained upstream of one or more preceding amplifiers in the cascade and/or the delay element presented by DCM 26 relative to EDFAb. The present invention utilizes these inputs in order to optimize the performance of the second (or subsequent) amplifier EDFAb as will be described in more detail below. For example, the control algorithm 42 according to the embodiment of FIG. 2 also receives as inputs control inputs PINa1 and PINa2 representative of the input and output power, respectively, of EDFAa upstream of the delay element presented by DCM 26.

More generally, the present invention relates to using information from one or more upstream optical amplifiers (e.g., EDFAa) included in a cascaded amplifier in order to better optimize the performance of one or more subsequent optical amplifiers (e.g., EDFAb) included in the cascaded amplifier. In the exemplary embodiment of FIG. 2, the control inputs PINa1 and/or PINa2 are input to the control algorithm 42. This provides at least two advantages.

Firstly, it provides at least one reference input (e.g., PINa1) that has not been altered by the preceding amplifier EDFAa. Thus, any errors or noise presented by EDFAa will not be present in the reference input provided to the control algorithm 42 for EDFAb. This avoids errors or noises accumulating with each additional stage in the amplifier 40.

Secondly, changes in the add/drop amplifier input signal or in any previous stage of the amplifier 40 can be used to alter the response of a subsequent stage even before the amplified input signal reaches the particular subsequent stage. In a sense, this gives the subsequent stage a "head start" on any corrections. For example, the control algorithm (e.g., 42) of a subsequent stage can use a reference input (e.g., PINa1 and/or PINa2) from a prior stage (e.g., EDFAa) to control the gain of a subsequent stage (e.g., EDFAb). In such case, the reference inputs (e.g., PINa1 and/or PINa2) are representative of a reference input that has not undergone a delay due to the delay element DCM 26 and/or inherent delays of any intervening components. This enables the control algorithm (e.g., 42) and subsequent stage (e.g., EDFAb) to get a head start on any corrections relative to the amplified signal received via the delay element (e.g., DCM 26) or otherwise subject to delay.

In an exemplary embodiment described below in relation to FIGS. 3 and 4, the control algorithm 42 differs from a conventional algorithm (such as control algorithm 30 in FIG. 1) simply by substituting control input signal PINb1 with a delayed version of control input signal PINa1 from the previous stage. The delay preferably is programmed and corresponds closely to the time delay between control input signals PINa1 and PINb1. However, the delay preferably is slightly less than the actual delay. This allows EDFAb to react even before it receives the amplified optical signal from DCM 26 on which EDFAb acts upon. The actual delay will be a function of the parameters of the EDFAs, the responses of the taps (e.g., 22, 24, 32 and 34), and the responses of any other elements (e.g., DCM 26) as will be explained in more detail below in relation to FIGS. 5-8. How much to shorten the programmed delay relative to the actual delay between PINa1 and PINb1 can be optimized, for example, by calculation, empirically, measurement of the time delay between PINa1 and PINb1 upon start up of the amplifier or in real time, etc., or via any other means.

Figure 3:
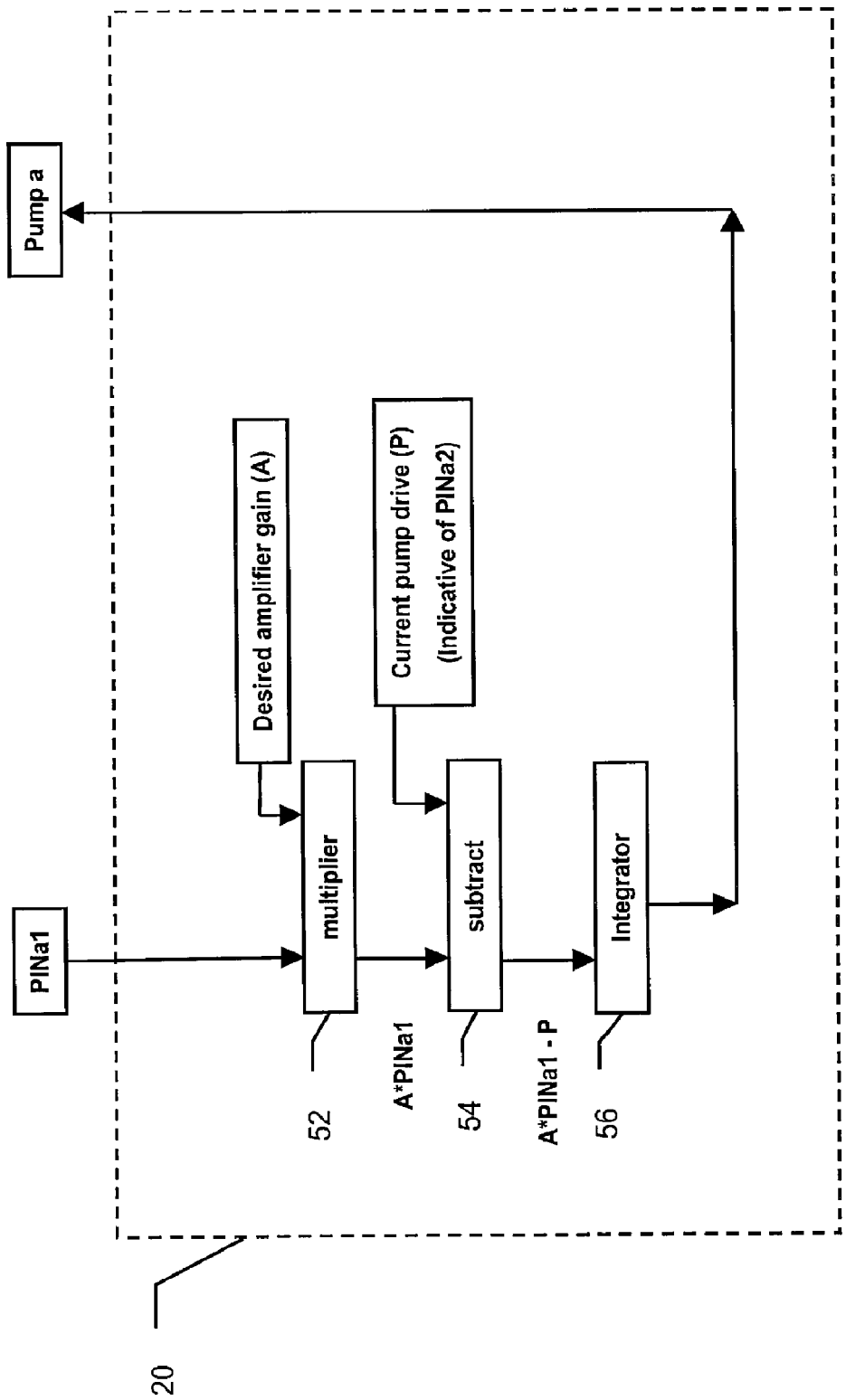
FIG. 3 is a block diagram representing a simplified control algorithm for a first amplifier in accordance with an exemplary embodiment of the present invention.

Referring now to FIG. 3, a block diagram representing the control algorithm 20 for EDFAa is shown in simplified form. As will be appreciated, the control algorithm 20 may be carried out via primarily hardware, software, or a combination thereof without departing from the scope of the invention. The control algorithm 20 includes a multiplier 52 receiving an input PINa1. The multiplier 52 also receives as an input a predefined (desired) amplifier gain setting (e.g., A). The multiplier 52 produces the output of EDFAa as represented by the product of PINa1 with the desired gain (e.g., A)

The output of the multiplier 52 is input to a subtractor 54 included in the control algorithm 20. The subtractor 54 compares this output with the pump drive control signal (P) provided to Pump a for controlling the pump current and thus the gain of EDFAa. Those having ordinary skill in the art will appreciate that the pump drive control signal (P) is indicative of the amplified optical signal output by EDFAa. In particular, the output of an EDFA tends to approach the value of the pump output, and thus the pump drive control signal (P) provided to EDFAa at a given time tends to be indicative of the output of EDFAa. In an actual control algorithm, the specific value of PINa2 also may be utilized as will be appreciated by those having ordinary skill in the art.

The subtractor 54 outputs a difference signal A*PINa1−P which represents the offset between the control signal P provided to Pump a and the desired output. Ideally, the output of the subtractor 54 is zero. The output of the subtractor 54 is input to an integrator 56 also included in the control algorithm 20. The integrator 56 integrates the offset so as to output the corrected pump drive control signal (P) to the Pump a in order to provide the desired gain (e.g., A).

The control algorithm 20 in FIG. 3 is conventional and hence further detail is omitted for sake of brevity. Those having ordinary skill will appreciate that the control algorithm 20 as shown in FIG. 3 may also be representative of the control algorithm 30 in the conventional amplifier 14 shown in FIG. 1.

Figure 4:
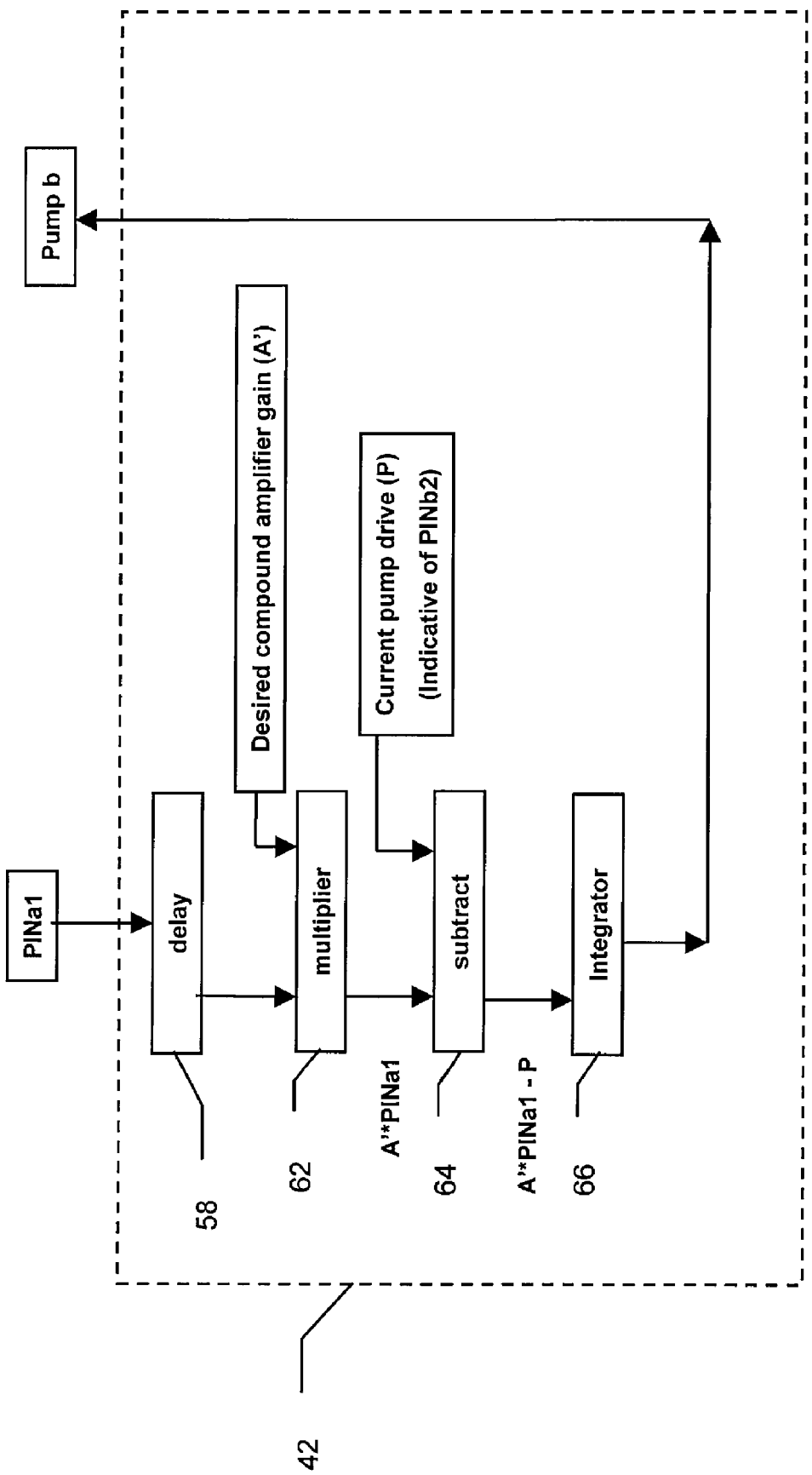
FIG. 4 is a block diagram representing a simplified control algorithm for a second amplifier in accordance with an exemplary embodiment of the present invention.

FIG. 4 illustrates the control algorithm 42 in accordance with the exemplary embodiment. Similar to the control algorithm in FIG. 3, again the algorithm 42 is simplified insofar as the current pump drive control signal provided to EDFAb is taken as indicative of the output power of EDFAb. As previously described, the primary difference between the control algorithm 42 and a conventional control algorithm (e.g., 30 of FIG. 1) is that a delayed control input PINa1 is substituted in place of control input PINb1 for controlling the gain of EDFAb. Similar to the control algorithm 20, the control algorithm 42 may be carried out via primarily hardware, software, or a combination thereof without departing from the scope of the invention.

Specifically, the control algorithm 42 receives the control input PINa1 from upstream of EDFAb. In this particular example, the control input from upstream of EDFAb is the input power to the preceding EDFAa. However, the control input may be derived from any other signal upstream (e.g., the output power of EDFAa prior to DCM 26) as previously noted. The control algorithm 42 includes a delay element 58 that receives the control input PINa1. The delay element 58 preferably is adjustable insofar as the amount of time the control input PINa1 is delayed by the delay element 58. As previously discussed, the delay preferably corresponds closely to the time delay between control input signals PINa1 and PINb1. Of course, in a different embodiment using a different control input obtained upstream, the time delay provided by delay element 58 would be selected to correspond closely to the relative time delay between the respective control inputs.

The control algorithm 42 is otherwise conventional in the exemplary embodiment. A multiplier 62 outputs a product signal A'*PINa1 representing the output of the combination EDFAa and EDFAb. The output of the multiplier 62 is input to a subtractor 64 included in the control algorithm 42. The subtractor 54 compares this output with the pump drive control signal (P) provided to Pump b for controlling the pump current and thus the gain of EDFAb. The subtractor 64 outputs a difference signal A'/(PINa1/PINb2)−P which represents the offset between the control signal P provided to Pump b and the desired gain. Ideally, the output of the subtractor 64 is zero. The output of the subtractor 64 is input to an integrator 66 also included in the control algorithm 42. The integrator 66 integrates the offset so as to output the corrected pump drive control signal (P) to the Pump b in order to provide the desired gain (e.g., compound gain A').

The control algorithm 42 according to the embodiment of FIG. 4 does not utilize the control input PINa2. However, another embodiment could also use PINa2 to further enhance performance. For example, the control algorithm 42 may use the control input PINa2 as an indicator of the gain error of EDFAa. In the event EDFAa and EDFAb are essentially the same type of amplifier, the control algorithm 42 can assume EDFAb would make the same error. The control algorithm 42 can then adjust the compound amplifier gain A' accordingly to compensate for such error. Such an embodiment is particularly useful in the case where the performance of the amplifiers EDFAa and EDFAb change in the same way, for example due to temperature changes or other external influences.

As previously noted, it is desirable that the control input obtained upstream in the cascaded amplifier be delayed by an appropriate amount in order to be used to control the gain of a subsequent stage. Ideally, the control input should be synchronized generally with whichever other control inputs are used to control the gain in the subsequent stage. The particular amount of the delay will depend on the time delays otherwise avoided as a result of the control input bypassing one or more elements in the cascade.

For example, the embodiment of FIGS. 2 and 4 substitutes control input PINa1 for PINb1. Unlike PINb1, control input PINa1 is not subject to the time delays associated with EDFAa, tap 24, DCM 26 and tap 32. Thus, the delay amount provided by delay 58 should be adjusted so as to be approximately equal to the combined delay of EDFAa, tap 24, DCM 26 and tap 32. Further, the delay 58 may take into account delays associated with the add/drop optical input signal itself, as discussed below in relation to FIG. 5. It will be appreciated, however, that the particular delay depends primarily on the particular signals being utilized by the control algorithm, the particular configuration of the cascaded amplifier, etc.

As previously noted, the particular time delay provided by delay 58 can be optimized, for example, by calculation, empirically, measurement of the time delay upon start up of the amplifier or in real time, etc.

Figure 5:
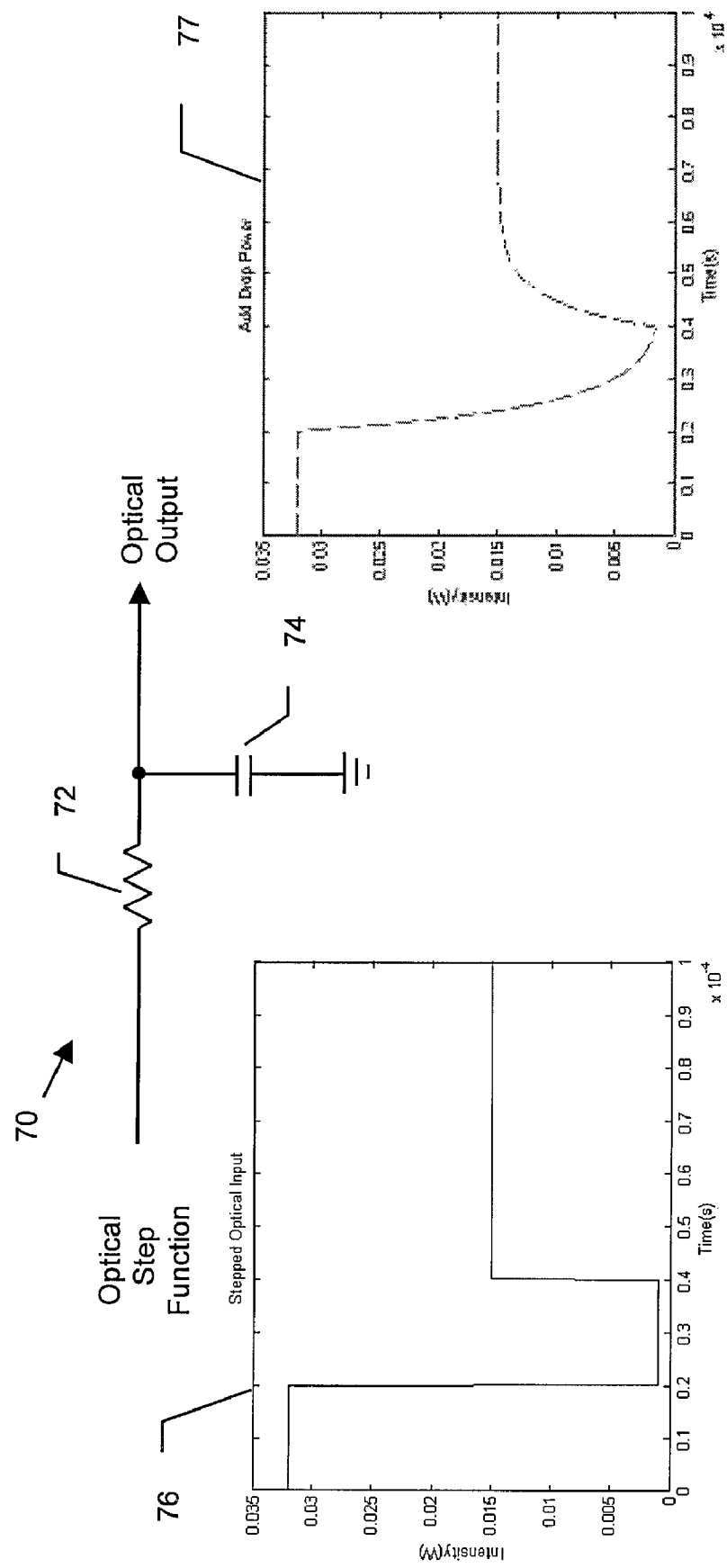
FIG. 5 is an electrical equivalent circuit model of an add-drop optical signal that is input to the cascaded optical amplifier in accordance with an exemplary embodiment of the present invention, an ideal input, and a simulated output.

Referring to FIG. 5, the response time of the add/drop signal input to the amplifier 40 may be calculated. FIG. 5 illustrates how the add/drop input signal may be modeled as a single low pass filter 70 having a resistor 72 and capacitor 74. The input to the filter 70 is an ideal optical step function as shown in graph 76 representing the drop and subsequent addition of an optical input. The output of the filter 70 as represented in graph 77 illustrates the delay introduced by the filter via the time constant associated with the filter 70. In the exemplary model shown in FIG. 5, the add/drop signal input exhibits a delay of approximately 5 microseconds ($\mu$s).

Figure 6:
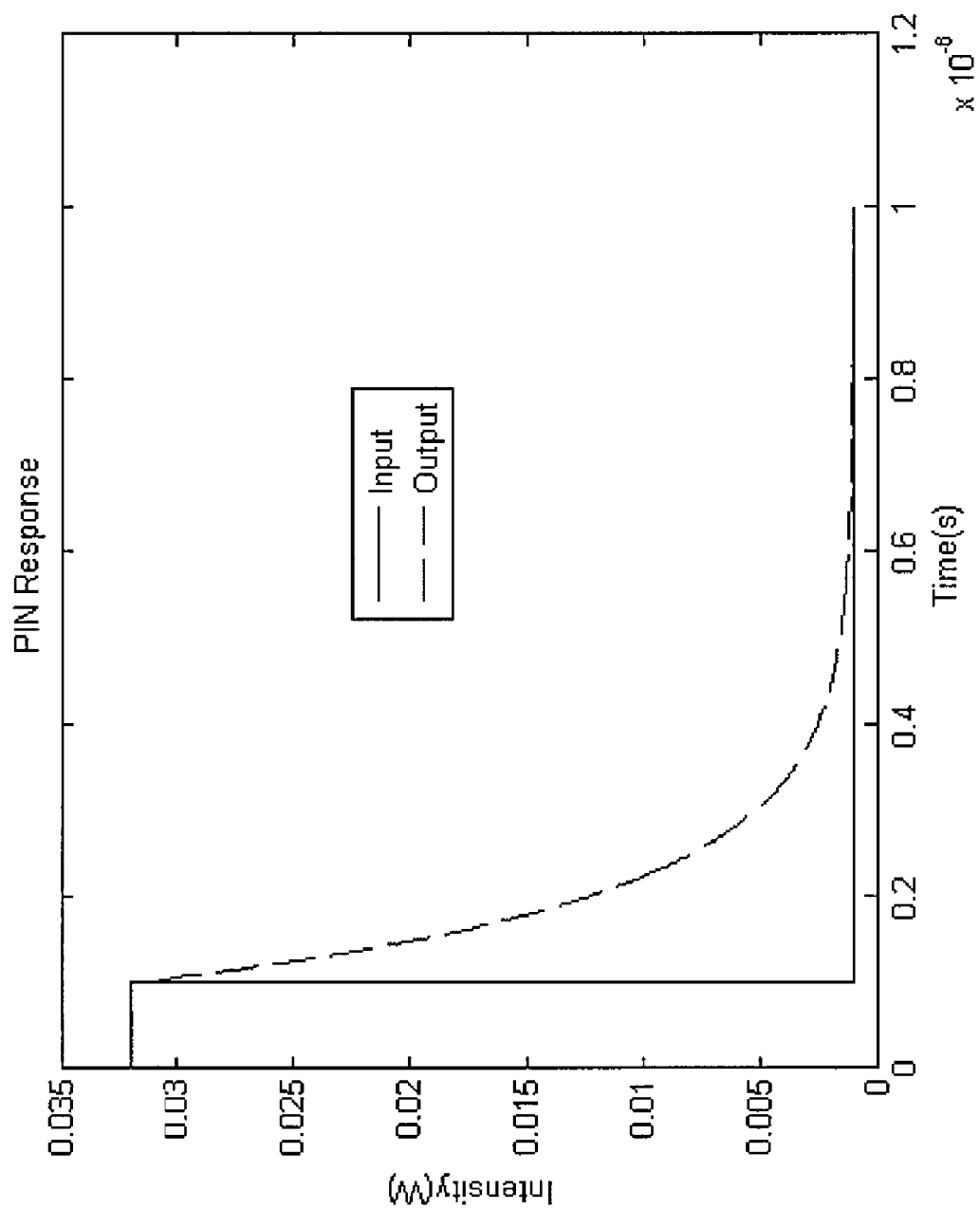
FIG. 6 represents a simulated response of a PIN diode used to sense optical power of the respective amplifiers in accordance with an exemplary embodiment of the present invention.

FIG. 6 represents the response of each of PINS 24 and 32. The PINS 24 and 32 also may be modeled as single pole low pass filters. In the exemplary embodiment, the time constant of the PINS 24 and 32 results in a delay of approximately 0.1 $\mu$s.

Figure 7:
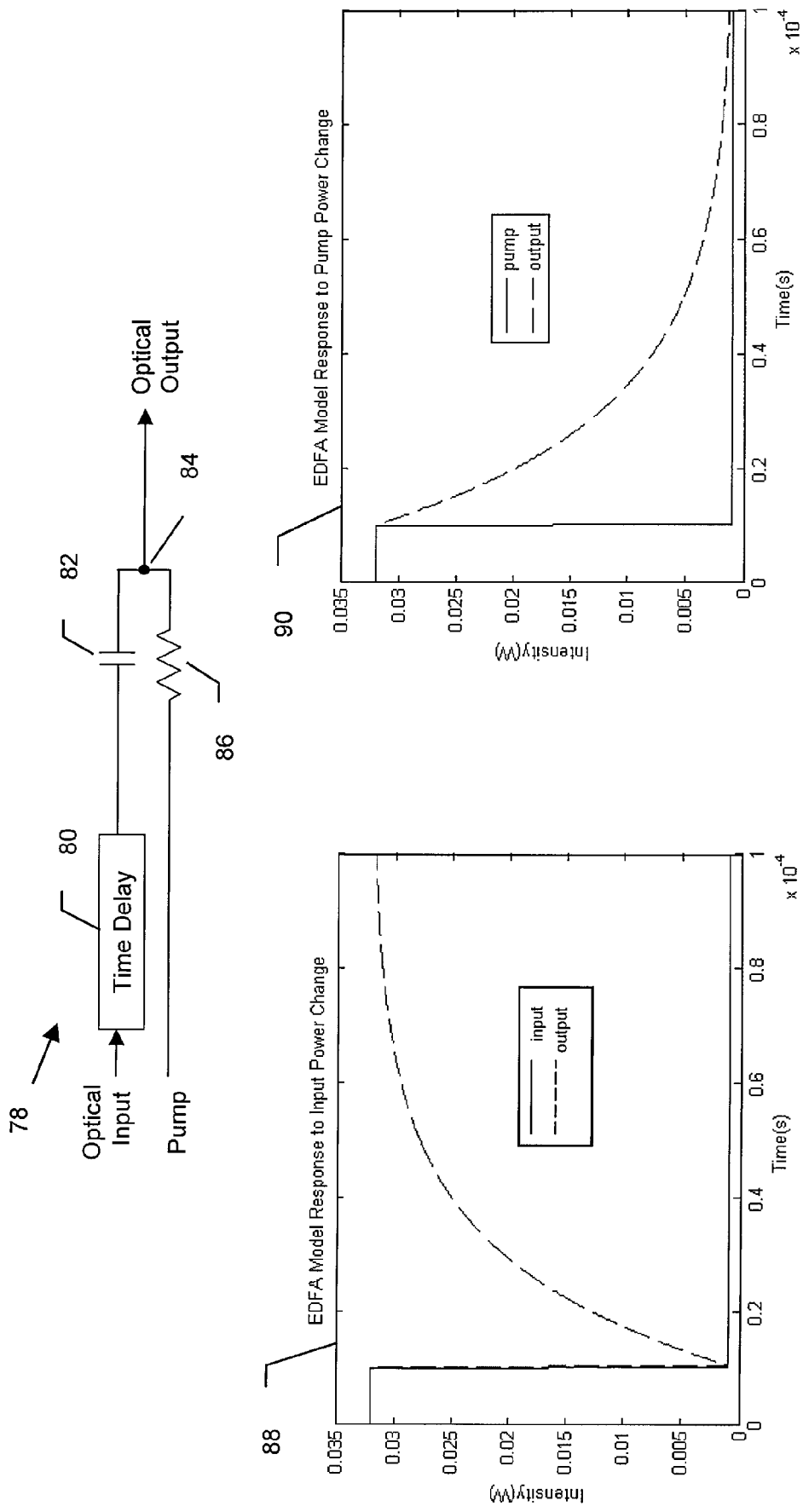
FIG. 7 is an electrical equivalent circuit model of EDFA included in the cascaded optical amplifier in accordance with an exemplary embodiment of the present invention, and a simulated response of the EDFA with respect to an input power change and a pump power change.

FIG. 7 represents a model 78 of an EDFA such as EDFAa and EDFAb. The model includes a time delay 80 that delays the optical input by a fixed time. The output of the time delay 80 is coupled via a capacitor 82 to output node 84. The pump input is modeled as a resistor 86 coupled to the output node 84. The response of the EDFA in relation to a change in optical input power is shown in graph 88. The response of the EDFA in relation to a change in pump power is shown in graph 90. As is noted in each case, there is an overall time delay associated with the delay 80 and RC component provided by capacitor 82 and resistor 86. In the exemplary embodiment, the time delay due to delay 80 is approximately 0.2 $\mu$s and the time delay due to the RC component is approximately 20 $\mu$s.

Figure 8:
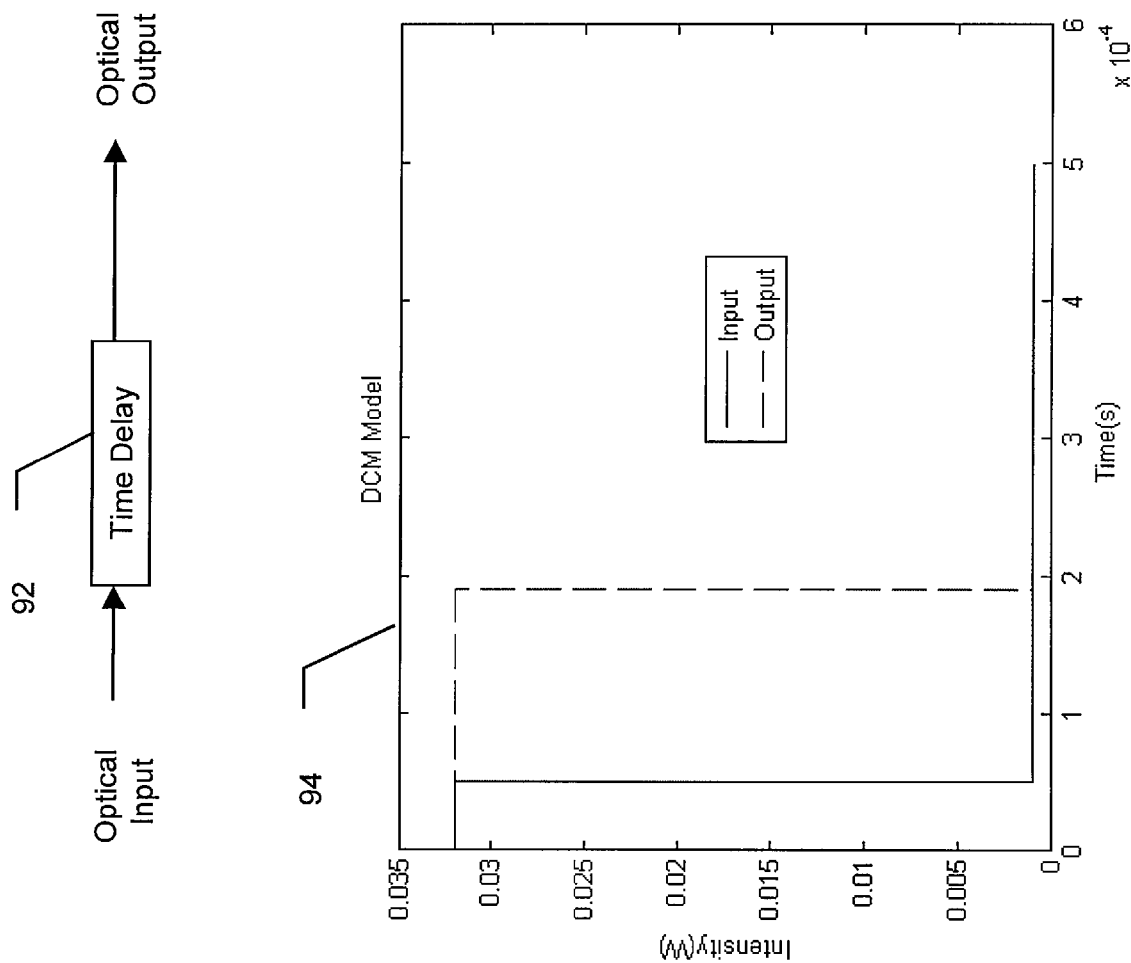
FIG. 8 graphically represents the response of a DCM as included in an exemplary embodiment of the present invention.

FIG. 8 represents a model of the DCM 26. The DCM 26 may be modeled simply as a time delay element 92. As is shown in graph 94, the output of the DCM 26 is a simple delay of the input. In the exemplary embodiment, the time delay is approximately 140 $\mu$s. Thus, in an amplifier such as that shown in FIG. 2 in accordance with the present invention, the DCM 26 represents the predominant delay between PINa1 and PINa2 relative to PINb1 and PINb2 as will be appreciated.

Further, although not shown in the Figures, the control algorithm 42 may itself have a delay associated with the processing time to carry out the appropriate control functions. For example, the control algorithm may have a delay due to processing of approximately 1 $\mu$s.

Generally speaking, the delay between PINa1 and PINa2 is simply the EDFA transition time that not only is quite short, but is also known and largely unchanging. The same may be said with respect to the delay between PINb1 and PINb2. The delay between PINa1 and PINb1 may not always be known. For example, the DCM 26 may be configured in the field (i.e., at the time of installation) rather than at the time of production of the amplifier. In such case, the delay between PINa1 and PINb1 can be measured at startup following installation in the field.

For example, the PINa1 to PINb1 delay can be determined upon startup by having the overall control algorithm for the amplifier 40 modulate the ASE noise of the first EDFAa by modulating its pump intensity. This would be detected in either of PINb1 or PINb2. A cross correlation between the modulated pump signal and the detected PINb1 or PINb2 can be used to determine the approximate delay presented by the DCM 26. The control algorithm 42 may then configure the delay 58 to provide such delay.

Once the delay for delay 58 is initially determined, the PINa1 to PNIb1 delay can be optimized and tracked by periodic measurements of the cross correlation function between PINa1 and PINb1 (or any of the PINa signals with any of the PINb signals) any time the input signal changes. This can be done as an overhead calculation as the changes are expected to be slow (usually caused by thermal variations). Indeed, a modulation of the EDFAa pump intensity can also be used while the amplifier is active as it can be canceled out using the subsequent EDFAb.

Figure 9A:
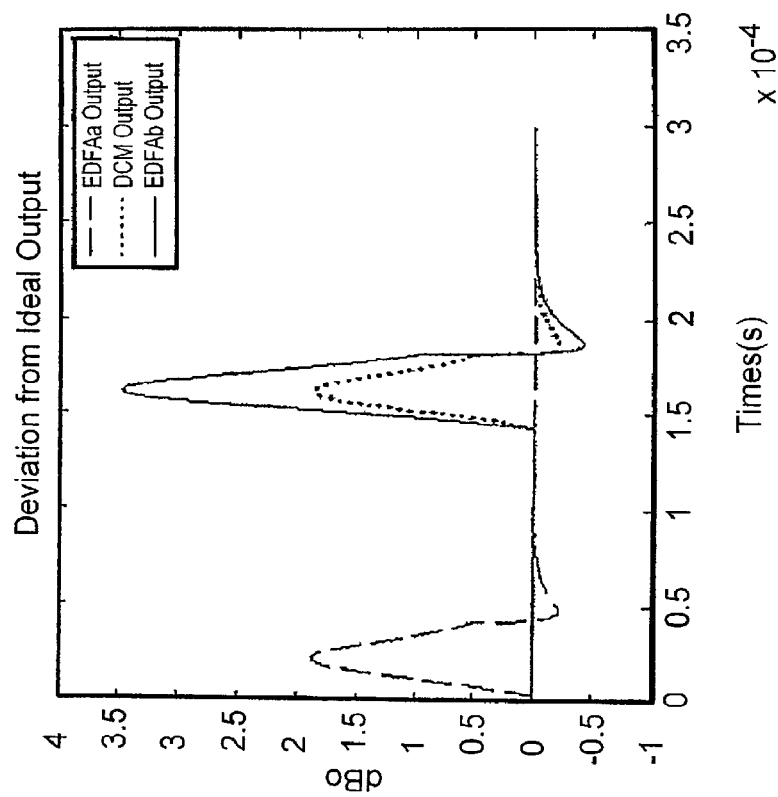
FIGS. 9A and 9B represent the simulated performance of a conventional cascaded optical amplifier of the type shown in FIG. 1.
Figure 9B:
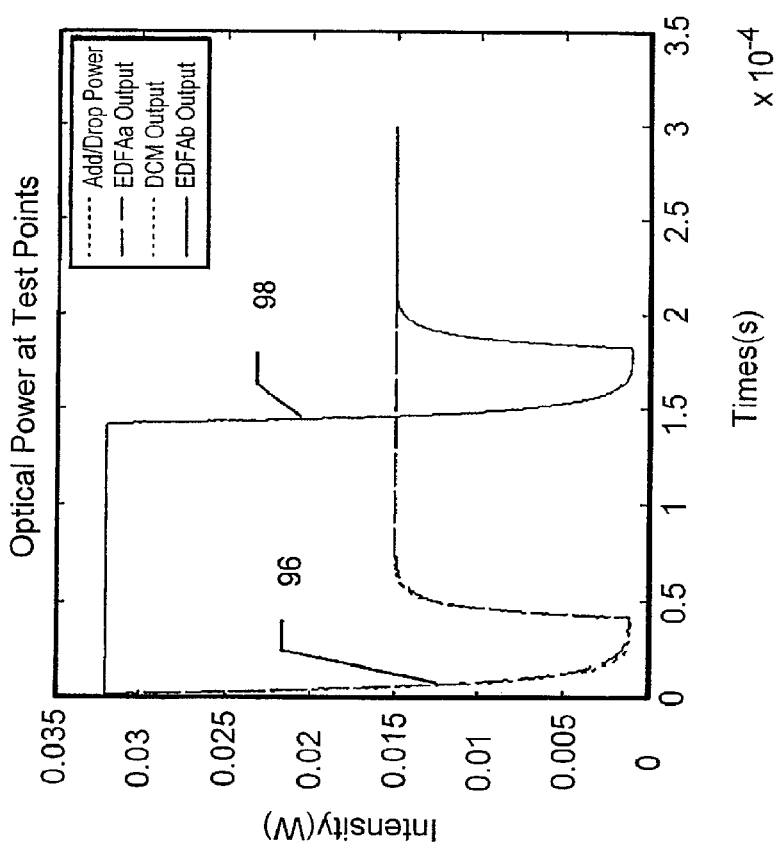

FIGS. 9A and 9B illustrate the deviation from ideal of a conventional amplifier 14 such as that shown in FIG. 1. The various time delays associated with the different components in the conventional amplifier are assumed to be equal to the corresponding components in the amplifier of FIG. 2 in accordance with the present invention. FIG. 9A illustrates a change in the power of the add/drop signal and the related changes in the outputs of EDFAa, DCM 26 and EDFAb. As noted above, the time delay of the DCM 26 and the time delays due to the response times of the EDFAs are substantially greater than the delays introduced by the other components. Consequently, the power of the add/drop signal and the output of EDFAa closely follow one another according to the scale of FIG. 9A and are represented collectively by composite line 96. Likewise, the output of DCM 26 and the output of EDFAb closely follow one another and are represented collectively as composite line 98.

As previously explained, the delay due to DCM 26 is intentionally provided within the cascaded amplifier. FIG. 9B, taking into account the intended delay of DCM 26, represents the deviation of the outputs of EDFAa, DCM 26 and EDFAb in relation to their ideal outputs according to the conventional amplifier. The dashed line in FIG. 9B represents the deviation of EDFAa relative to its ideal output. As is noted, the deviation of EDFAa peaks at approximately 2.0 decibels (db). This same deviation is carried thru to the DCM 26 whose output also then deviates by approximately 2.0 db as represented by the dotted line.

The solid line in FIG. 9B illustrates the deviation in the output of EDFAb from its ideal output. Due to the deviation in the output from EDFAa in combination with the deviation introduced by EDFAb itself, the output of EDFAb deviates from its ideal at a peak of approximately 3.5 db as shown in FIG. 9B.

Figure 10:
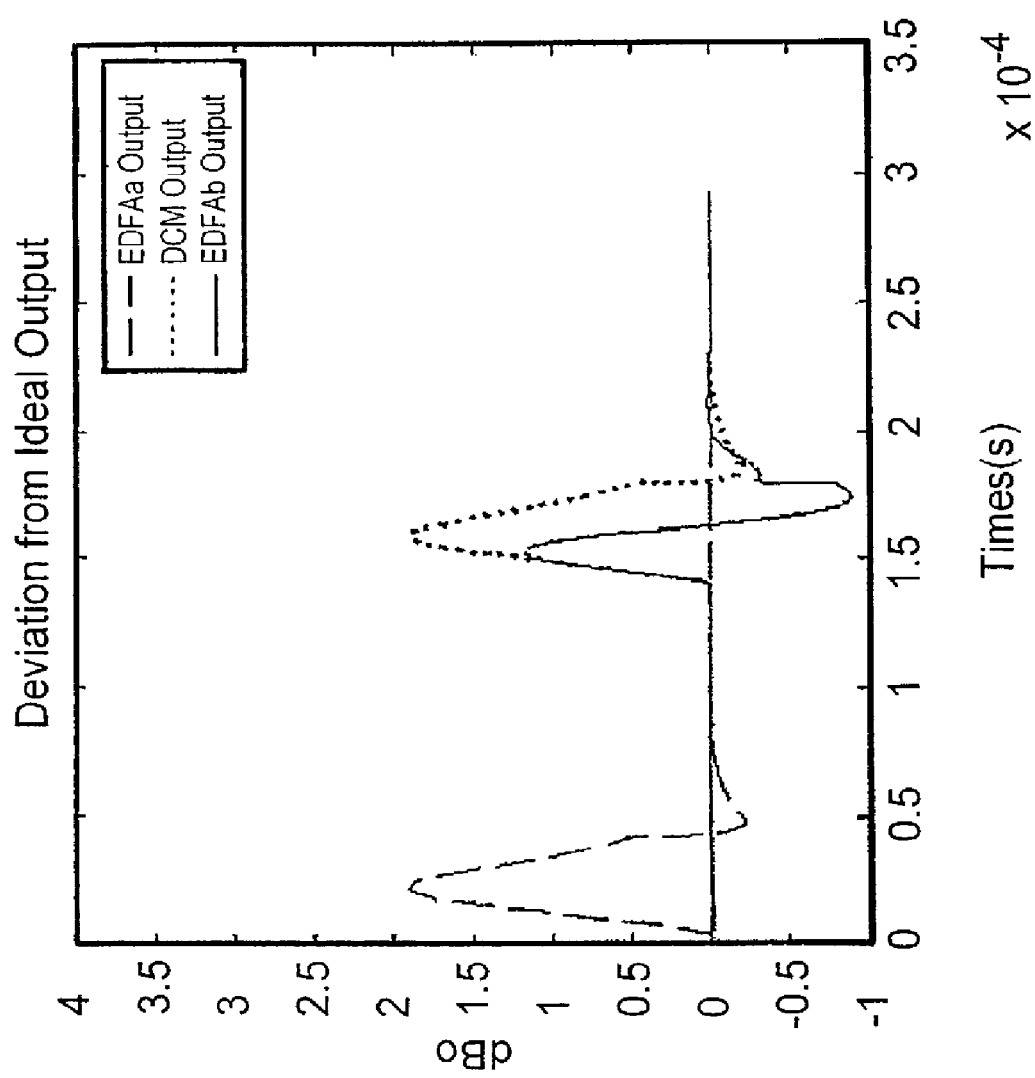
FIG. 10 represents the simulated performance of a cascaded optical amplifier in accordance with the exemplary embodiment of the invention as shown in FIG. 2.

In comparison, FIG. 10 illustrates the response of the amplifier 40 of FIG. 2 in accordance with the exemplary embodiment of the present invention. The add/drop power input and associated component delays are identical to that represented in FIG. 9A with respect to the conventional amplifier 14. According to the exemplary embodiment of the invention, however, the control input PINa1 is substituted for PINb1 in the control algorithm 42. Consequently, any errors otherwise introduced by preceding EDFAa are effectively bypassed and thus are not input to EDFAb. The delay element 58 is configured to provide a time delay of 161.2 µs based on the above-discussed models of the respective components (e.g., EDFA=20.2 µs, DCM=140 µs).

As is shown in FIG. 10, the deviation in the outputs of EDFAa and DCM 26 remain unchanged. However, the deviation in the output of EDFAb from its ideal is substantially less than in the case of the conventional amplifier 14. More specifically, the solid line in FIG. 10 illustrates how the output of EDFAb has a peak deviation of 1.2 db. This represents an improvement over the conventional amplifier of over 2 db.

Thus, it will be appreciated that the present invention provides a significant improvement in the performance of the amplifier.

Although the invention has been shown and described with respect to certain preferred embodiments, it is obvious that equivalents and modifications will occur to others skilled in the art upon the reading and understanding of the specification. For example, the cascade amplifier 40 in accordance with the present invention may include more than two EDFAs cascaded in series without departing from the scope of the invention The invention has application with respect to any subsequent amplifier stage receiving as a control input a signal obtained from a preceding stage. The preceding stage need not be the immediately preceding stage as will be appreciated. Rather, the preceding stage can be any preceding stage.

Further, the basic control algorithms described herein can be further revised to optimize the response in accordance with the present invention. For example, the impulse response of the EDFAs (e.g., to the input signal and/or the pump intensity) can be determined to the extent they are linear. The impulse response can be used to calculate an inverse to the input signal measured before any delay (e.g., DCM 26). The inverse response is then provided to the pump of the subsequent EDFA to optimize its response.

While the present invention has been described herein as having separate control algorithms for the respective EDFAs, it will be appreciated that each of the particular algorithms may be referred to collectively as part of the same controller.

The present invention includes all such equivalents and modifications, and is limited only by the scope of the following claims.

What is claimed is:

1. A cascaded optical amplifier, comprising:
a first optical amplifier and a second optical amplifier in cascaded arrangement, each of the first optical amplifier and the second optical amplifier having a respective input for receiving an optical signal, an output for outputting an amplified optical signal, and a control input for controlling the gain of the optical amplifier;
a sensor for sensing upstream of the input of the second optical amplifier a signal relating to operation of the cascaded optical amplifier;
a controller for providing control signals to the respective control inputs of the first optical amplifier and the second optical amplifier, the controller providing the control signal to the second optical amplifier as a function of the sensed signal; and
a delay introducing element coupled between the output of the first optical amplifier and the input of the second optical amplifier, the sensed signal being sensed upstream of the delay introducing element,
wherein the controller delays the sensed signal as a function of the delay introduced by the delay introducing element.

2. The amplifier of claim 1, wherein the sensed signal represents the optical signal input to the first optical amplifier.

3. The amplifier of claim 1, wherein the sensed signal represents the amplified optical signal output from the first optical amplifier.

4. The amplifier of claim 1, wherein the sensor comprises first and second sensors, and the sensed signal comprises a first sensed signal representing the optical signal input to the first optical amplifier and a second sensed signal representing the amplified optical signal output from the first optical amplifier.

5. The amplifier of claim 1, further comprising at least a third optical amplifier included in the cascaded arrangement between the first and second optical amplifiers.

6. The amplifier of claim 1, wherein the controller provides the control signal to the second optical amplifier based on a comparison of the amplified optical signal output or the pump drive signal from the second optical amplifier and the sensed signal.

7. The amplifier of claim 6, wherein the comparison comprises a ratio.

8. The amplifier of claim 1, wherein the controller includes a sensed signal delay element for providing the delay to the sensed signal, the amount of the delay provided by the sensed signal delay element being determined to synchronize approximately the sensed signal received by the controller with at least one other signal received by the controller for carrying out control.

9. The amplifier of claim 1, wherein the first optical amplifier and the second optical amplifier are erbium doped fiber amplifiers.

10. The amplifier of claim 1, wherein the controller delays the sensed signal as a function of the delay introduced by the delay introducing element as measured by the controller.

11. The amplifier of claim 1, wherein the delay introducing element is a dispersion compensation module (DCM).

12. A method of controlling a cascaded optical amplifier, the cascaded optical amplifier comprising: a first optical amplifier and a second optical amplifier in cascaded arrangement, each of the first optical amplifier and the second optical amplifier having a respective input for receiving an optical signal, an output for outputting an amplified optical signal, and a control input for controlling the gain of the optical amplifier; and a controller for providing control signals to the respective control inputs of the first optical amplifier and the second optical amplifier, the method comprising the steps of:

sensing upstream of the input of the second optical amplifier a signal relating to operation of the cascaded optical amplifier; and providing the control signal to the second optical amplifier as a function of the sensed signal, wherein the cascaded amplifier further comprises a delay introducing element coupled between the output of the first optical amplifier and the input of the second optical amplifier, and the sensed signal is sensed upstream of the delay introducing element, and further comprising the step of delaying the sensed signal as a function of the delay introduced by the delay introducing element.

13. The method of claim 12, wherein the sensed signal represents the optical signal input to the first optical amplifier.

14. The method of claim 12, wherein the sensed signal represents the amplified optical signal output from the first optical amplifier.

15. The method of claim 12, wherein the sensing step comprises sensing a first sensed signal representing the optical signal input to the first optical amplifier and sensing a second sensed signal representing the amplified optical signal output from the first optical amplifier.

16. The method of claim 12, comprising the step of providing the control signal to the second optical amplifier based on a comparison of the amplified optical signal output or the pump drive signal from the second optical amplifier and the sensed signal.

17. The method of claim 16, wherein the comparison comprises a ratio.

18. The method of claim 12, wherein the step of delaying the sensed signal comprises delaying the sensed signal by an amount determined to synchronize approximately the sensed signal received by the controller with at least one other signal received by the controller for carrying out control.

19. The method of claim 12, wherein the first optical amplifier and the second optical amplifier are erbium doped fiber amplifiers.

20. The method of claim 12, comprising the step of delaying the sensed signal as a function of the delay introduced by the delay introducing element as measured in a measuring step.

21. The method of claim 12, wherein the delay introducing element is a dispersion compensation module (DCM).

22. The amplifier of claim 8, wherein the amount of the delay provided by the sensed signal delay element is adjustable.

23. The method of claim 12, comprising the step of measuring the delay introduced by the delay introducing element.

24. The method of claim 12, comprising the step of programming the delay introduced by the delay introducing element into the controller.

* * * * *